United States Patent [19]

Rowe et al.

[11] Patent Number: 4,457,560
[45] Date of Patent: Jul. 3, 1984

[54] HUBCAP WITH IMPROVED RETENTION STRUCTURE

[75] Inventors: Robert L. Rowe, 5072 Timberview Ct., Saline, Mich. 48176; Kenneth W. Christensen, Southfield, Mich.

[73] Assignees: General Motors Corporation, Detroit, Mich.

[21] Appl. No.: 337,782

[22] Filed: Jan. 7, 1982

[51] Int. Cl.³ .............................................. B06B 7/06
[52] U.S. Cl. ............................... 301/37 P; 301/108 A
[58] Field of Search ................. 301/37 P, 37 R, 37 S, 301/37 TP, 37 PB, 108 R, 108 S, 108 A

[56] References Cited

U.S. PATENT DOCUMENTS

| | | | |
|---|---|---|---|
| 3,653,719 | 4/1972 | Osawa et al. | 301/37 S |
| 4,007,967 | 2/1977 | Buerger | 301/37 R X |
| 4,123,111 | 10/1978 | Renz et al. | 301/37 S X |
| 4,133,583 | 1/1979 | Spisak | 301/37 P X |
| 4,316,638 | 2/1982 | Spisak | 301/37 P |
| 4,357,053 | 11/1982 | Spisak | 301/37 P X |

FOREIGN PATENT DOCUMENTS

| | | | |
|---|---|---|---|
| 861075 | 1/1941 | France | 301/108 R |
| 1101138 | 9/1955 | France | 301/37 TP |
| 493396 | 10/1938 | United Kingdom | 301/108 FE |
| 531481 | 1/1941 | United Kingdom | 301/108 R |

*Primary Examiner*—David A. Scherbel
*Assistant Examiner*—Russell D. Stormer
*Attorney, Agent, or Firm*—Herbert Furman

[57] ABSTRACT

A hubcap comprises an outer plastic hubcap element and an inner metal retention element secured together. The retention element includes retention tabs, circumferentially spaced, which are disposed in apertures of the plastic hubcap element, the apertures matching the pattern of the wheel fasteners. When the hubcap is installed, the wheel fasteners are disposed in the apertures with the retention tabs engaging the wheel fasteners to retain the hubcap in the installed position.

7 Claims, 5 Drawing Figures

HUBCAP WITH IMPROVED RETENTION STRUCTURE

BACKGROUND AND SUMMARY OF THE INVENTION

This invention relates to hubcaps for use with vehicle wheels and is particularly concerned with an improved retention structure for such hubcaps.

Hubcaps are used on car and truck wheels to cover the wheel or axle hubs. A hubcap can be both functional in protecting the hub from exposure and decorative in presenting an attractive appearance. The advantages of plastic materials render use of plastic desirable in certain instances for fabrication of hubcaps. Plastic can be molded to desired design and appearance shapes, can be decorated, and can provide suitable protection for the hub. Plastic also has the advantage of being light in weight.

Recent trends in the automotive industry involving downsizing of vehicles have imposed rather severe demands on many component parts. One of these is plastic hubcaps. It has been observed that in smaller front wheel drive vehicles, for example those having 13 or 14 inch tires, hubcaps are exposed to increased temperature levels over those which occur in larger vehicles. One reason for this is that the smaller wheels must revolve at higher r.p.m.'s for the same vehicle speed.

It has heretofore been proposed to incorporate retention structure directly into the plastic hubcap itself. While this is certainly desirable from a manufacturing cost standpoint, such plastic retention structure has been less than satisfactory for down-sized vehicles.

The problem of providing suitable hubcap retention is further compounded because of the build-up of tolerances in the various component parts which go to make up a hub and wheel construction. In the mass production of vehicles, individual component parts are subject to certain manufacturing tolerances. Because it is impractical to match individual components so as to keep the accumulation of tolerances within a very narrow range, wheel cover retention must be capable of accomodating the random assembly of individual component parts of the wheel and hub construction while still meeting the automobile manufacturer's performance specifications.

The present invention is directed to a new and improved retention structure which is particularly well-suited for mounting a plastic hubcap on a wheel. With the present invention the advantages of plastic construction for the hubcaps are realized while at the same time the hubcap is capable of meeting the current specifications established by automobile manufacturers. Particularly, a hubcap embodying principles of the invention is well suited for use with smaller front wheel drive type vehicles where plastic alone is not. The invention renders a plastic hubcap securely retained on the wheel and hub assembly during use and can accommodate the overall tolerance range which is typical in the random assembly of the constituent parts of the wheel and hub construction. The hubcap of the present invention has the further advantage that it is an assembly of only two component parts, one of which is an outer plastic hubcap element and the other of which is an inner metal retention element. The outer plastic hubcap element provides the decorative and protective capabilities of a hubcap while the retention element provides the installation and retention characteristics.

For certain reasons in the design of a wheel and hubcap, it may be deemed desirable for the wheel fasteners which fasten the wheel to the axle or spindle to be exposed to view when the hubcap is mounted over the hub. The wheel fasteners may be decorative items themselves which present an attractive appearance in conjunction with the hubcap. Unfortunately such exposed fasteners impose a further restriction on the retention structure by which the hubcap is retained.

Prior attempts to incorporate integral plastic retention fingers into the hubcap itself for retentive engagement with the wheel fasteners have proved unsuccessful. They cannot accomodate the automobile manufacturer's specifications, particularly in the case of the down-sized vehicles.

The present invention solves the foregoing problem by having metal retention structure which engages the wheel fasteners to securely retain the hubcap on the hub and wheel assembly. More specifically, the present invention provides a plastic hubcap element and a metal retention element secured together. The metal retention element is disposed on the inside of the plastic hubcap element and includes retention tabs arranged in a pattern corresponding to that of the wheel fasteners and projecting from a main body into apertures in the plastic hubcap element so that the tabs retentively engage the wheel fasteners, which also are disposed within the apertures of the plastic hubcap element. In the disclosed preferred embodiment of hubcap, the apertures are circular holes, and each of the retention tabs is of circular contour coextensive with a radially inner edge segment of the corresponding hole and engaging the radially inner peripheral portion of the corresponding wheel fastener. The hubcap element and the retention element are secured together without any separate fasteners by lanced tabs formed in the retention element which engage plastic pins integrally formed with the plastic hubcap element.

The foregoing features, advantages, and benefits of the invention, along with additional ones, will be seen in the ensuing description and claims which should be considered in conjunction with the accompanying drawings.

The drawings disclose a preferred embodiment of the invention according to the best mode contemplated at the present time for carrying out the invention.

DESCRIPTION OF THE PREFERRED EMBODIMENT

Figures 2, 5:
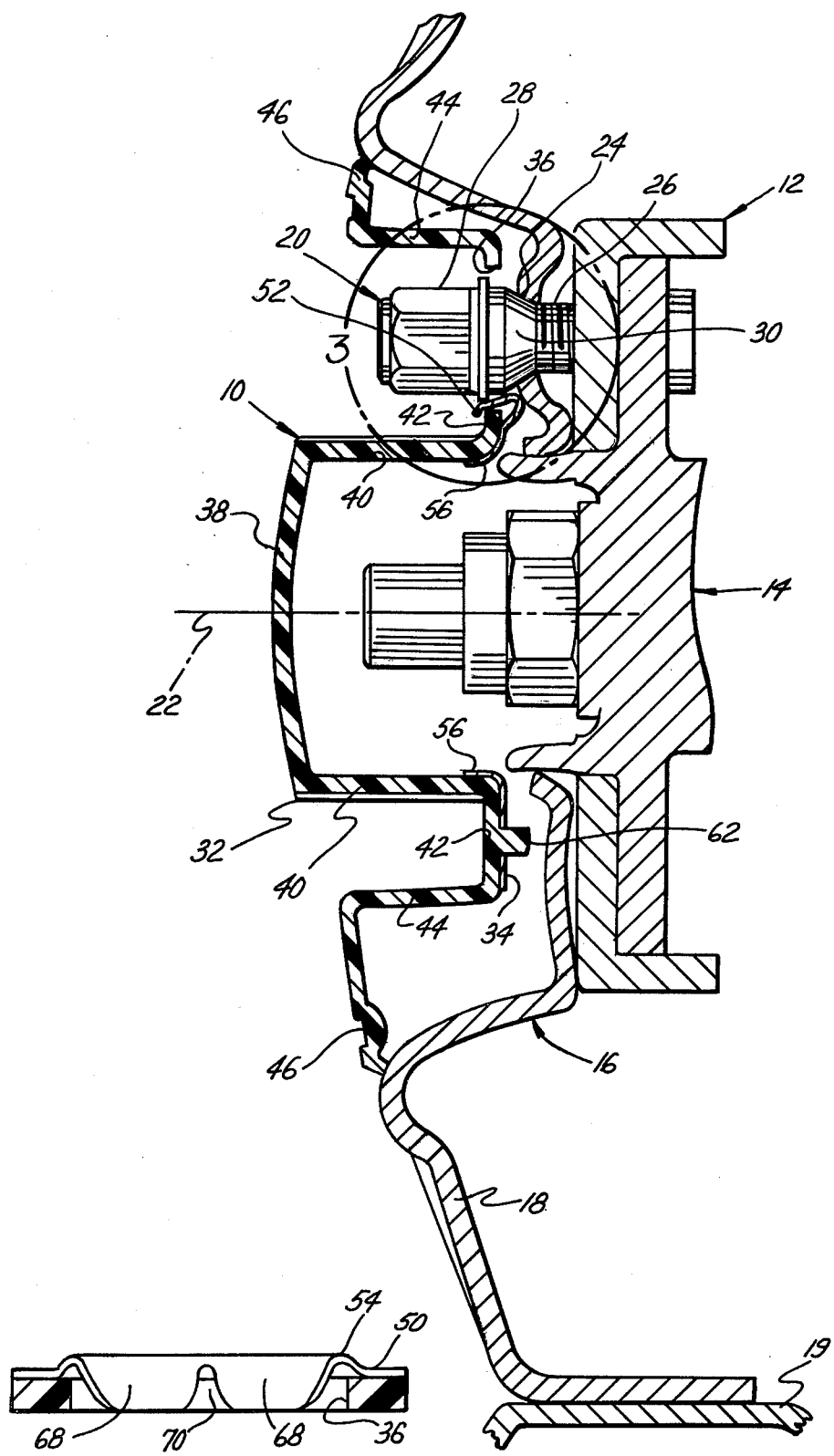
FIG. 2 is a diametrical sectional view, on an enlarged scale, taken in the direction of arrows 2—2 in FIG. 1, and showing the hubcap in use.
FIG. 5 is a fragmentary sectional view taken in the direction of arrows 5—5 in FIG. 1 and slightly enlarged.

FIG. 2 shows a hubcap 10 embodying principles of the present invention mounted on a hub and wheel assembly generally designated by the reference numeral 12. The hub and wheel assembly 12 may be considered as comprising a hub assembly designated by the general reference numeral 14 and a wheel 16. The hub assembly comprises a number of component parts assembled together, and the wheel 16 is a typical automotive type wheel comprising a stamped metal spider 18 and a roll-formed rim 19 in which a tire (not shown) is seated. The wheel 16 mounts on hub assembly 14 by means of a plurality of fasteners 20 which are uniformly arranged in a circular pattern around tha axis of rotation 22 of the hub and wheel. In the present embodiment there are five such fasteners 20 equally spaced in a circular pattern, and it will be appreciated that other patterns are contemplated within the scope of the present invention. The wheel spider 18 comprises a plurality of holes 24 arranged to conform to the circular pattern of the fasteners 20 serving to mount the wheel to the hub assembly.

The illustrated wheel fasteners 20 are merely illustrative, but they constitute a preferred method which is generally used in the industry. The fasteners comprise threaded studs, or bolts, 26 affixed on and projecting axially outwardly of the hub assembly 14 parallel to axis 22. The wheel 16 mounts on the hub assembly by aligning the holes 24 with the bolts 26 and then placing the wheel over the hub assembly so that the bolts 26 extend through the holes 24. The fastening procedure is completed by threading a nut 28 onto the free end of each bolt 26 with the nut being tightened to a point so as to securely mount the wheel on the hub assembly. Each nut includes a chamfer 30 tapering inwardly to engage a similar taper which may be provided in the shape of hole 24. The nut 28 may be a single element having a polygonally shaped head which may be engaged by a tool used to tighten and untighten the nut. Alternatively the nut may be an assembly comprising a main body with a decorative cap assembled on to the main body, also of polygonal shape for tightening and untightening by a tool.

Figure 1:
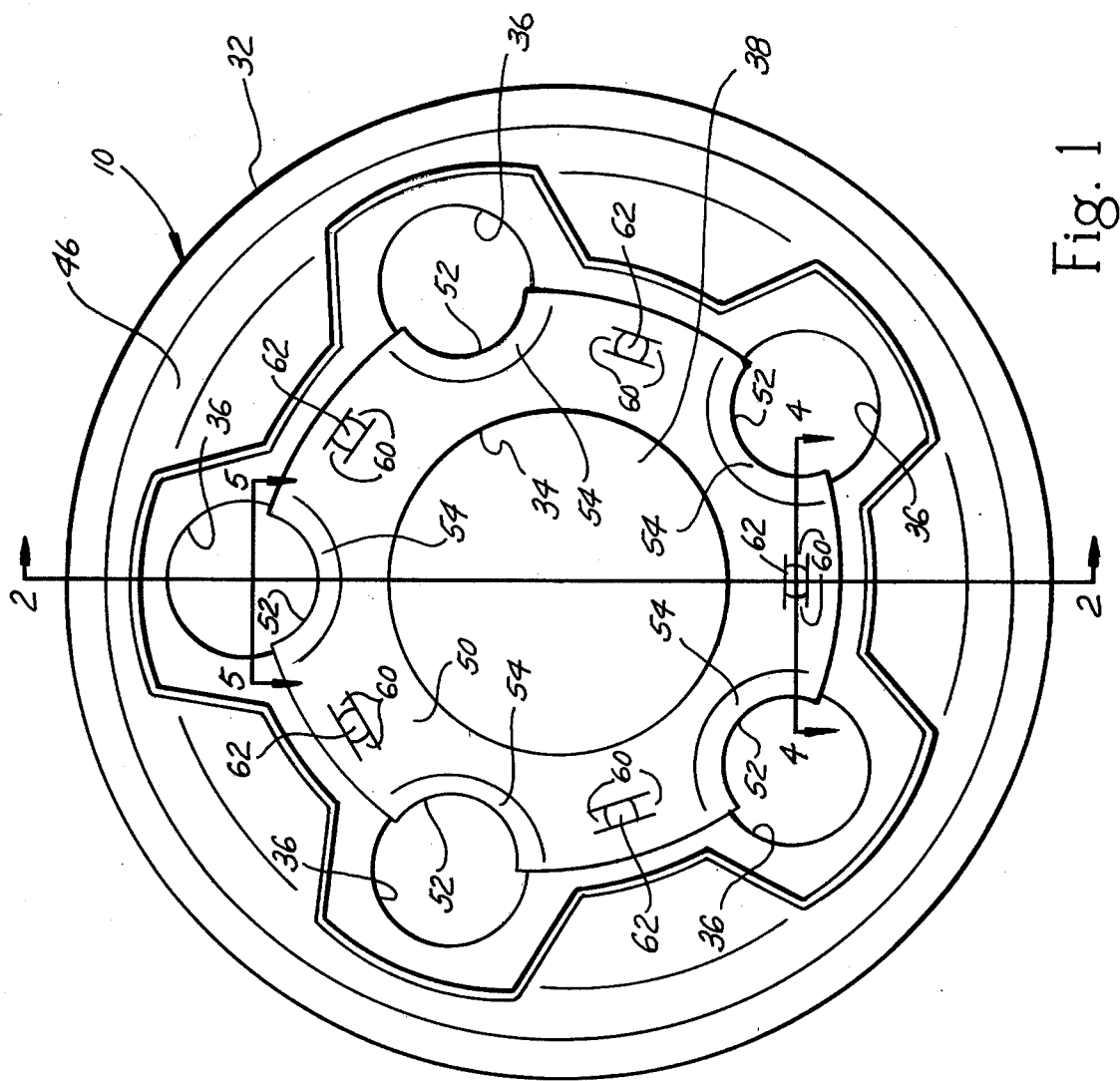
FIG. 1 is a plan view of the inner face of a hubcap embodying principles of the present invention.

The hubcap 10 of the present invention comprises an outer plastic hubcap element 32 and an inner metal retention element 34 which are secured together in assembly. Element 32 includes apertures 36 arranged in a circulr pattern corresponding to that of fasteners 20. In the disclosed preferred embodiment these apertures are circular holes, and it is contemplated that other aperture shapes, such as elongated slots, may be employed in accordance with principles of the invention. The further details of the disclosed embodiment of hubcap element include a central cap region presenting a convex outwardly facing wall 38 with a circular axial wall 40 extending inwardly from the outer perimeter of wall 38. The axially inner end of wall 40 joins to an annular radial wall 42 which latter wall contains the apertures 36. The radially outer perimeter of wall 42 leads to an axially extending wall 44 and in turn to an outer radial flange 46. As best seen in FIG. 1 the rear wall 42 containing the apertures 36 has a spoke-like configuration with each aperture 36 being located in one of the spokes. Hence this construction of the hubcap element is such that when its outer face is viewed axially, the fasteners appear to be disposed within recesses of the cap element. As noted above, it will be appreciated that the construction of the hubcap element is exemplary and that other designs and shapes are contemplated within the scope of the invention.

Retention element 34, as perhaps best seen in FIG. 1, possesses an annular shape. The retention element may be considered as comprising a circular main body portion 50 disposed against hubcap element 32 on the interior of the hubcap element. The retention element is further provided with a retention tab at each of the apertures 36 of the hubcap element. Each retention tab is designated by the general reference numeral 52 and each has a radially outwardly (relative to axis 22) concave shape corresponding to the circularly concave contour of the edge portion of the circular aperture 36 within which it is disposed. Each tab 52 joins to the main body portion 50 by a beaded portion 54. In this way each retention tab 52 is disposed for engagement with a corresponding fastener 20 when the hubcap 10 is mounted on the wheel and hub assembly 14. The annular retention element also includes a curled lip 56 at its radially inner periphery which extends over and around the junction between wall 40 and wall 42.

Figure 4:
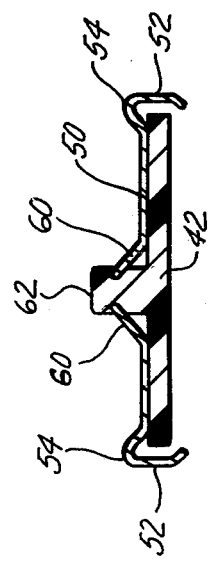
FIG. 4 is a fragmentary sectional view taken in the direction of arrows 4—4 in FIG. 1 and slightly enlarged.

The plastic hubcap element and the metal retention element are secured together in a manner which can be best seen in FIG. 4. The flat main body of the retention element is provided with lanced fingers 60 arranged as opposed pairs at equal intervals around the retention element. Each pair of fingers is centered between two of the apertures 36. The retention fingers are lanced from the main body during fabrication of the retention element, and the free ends thereof are shaped to retentively engage the perimeter of cylindrical pins 62 which project inwardly from the wall of the hubcap element between the apertures 36.

In this way the retention element is designed to fit with conformity upon its assembly to the hubcap element, and assembly is accomplished by axially aligning the two elements and then urging them together to dispose the main body portion 50 of the retention element against the wall 42 of the hubcap element with fingers 60 engaging the pins 62 and with the tabs 52 disposed in the apertures 36. Because the lanced fingers 60 are directed in the sense shown, they allow easy assembly of the two elements yet strongly resist any attempted disassembly. It will thus be observed that the entire assembly of the two elements comprises those two elements along since the fingers and the pins are formed integrally with their respective elements.

Figure 3:
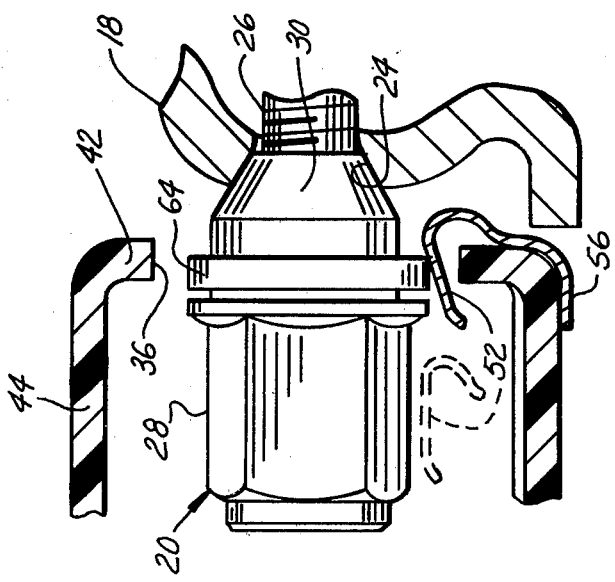
FIG. 3 is a fragmentary enlarged view taken in circle 3 of FIG. 2.

The solid line position of FIG. 3 shows the hubcap mounted on the wheel and hub assembly with the tabs 52 engaging the nuts 28 of wheel fasteners 20. In this position each tab 52 is deflected at an angle in relation to axis 22. The broken line position shown in FIG. 3 illustrates the free position of the retention tabs prior to mounting of the hubcap to the hub and wheel assembly. In this free position the tabs 52 are disposed in a sense which is generally parallel to axis 22. The retention element is so dimensioned in relation to the wheel fasteners that upon mounting of the hubcap, an interference is encountered between the retention tabs and the radially inward portions of the wheel nuts. Continued urging of the hubcap to its full mounting position causes flexing of the retention tabs in the manner illustrated by FIG. 3 whereby their resiliency exerts a force on the wheel fasteners keeping the hubcap in the full mounting position.

Because of the stack-up of tolerances of the component parts of the wheel and hub assembly, including the wheel fasteners, the particular location of the fasteners in relation to the axis 22 is subject to a tolerance range. The construction of the hubcap is such that it is securely retained on the wheel and hub assembly for any given location of the wheel fasteners within the tolerance stack-up. Stated another way, the hubcap of the present invention is designed to have an interference fit with the wheel fasteners high side of the tolerance stack-up; necessarily, this will result in an interference fit at the low side. Nonetheless, the retention tabs are capable of deflecting in corresponding amounts to accommodate any given installation within the tolerance band.

FIG. 2 shows the hubcap fully mounted on the wheel and hub assembly. The outer peripheral flange 46 may provide an abutment with the wheel spider to define the inward position of the hubcap on the wheel and hub assembly. Such abutment will take place, however, only after the retention tabs have been placed into retentive engagement with the wheel fasteners.

It is anticipated that the hubcap will require removal only when wheel or tire service is called for, such as in the case of a flat tire. In those situations the act of removing the wheels nuts will inherently allow removal of the hubcap. Alternatively, a suitable tool could possibly be inserted between flange 46 and the wheel spider 18 to pry the hubcap off without unloosening and removing the wheel nuts, provided that the plastic is made strong enough. While the invention allows the hubcap to be installed onto the already tightened nuts 28 (as explained above) by pushing it onto the wheel, it would be possible to install the hubcap by placing it onto the wheel before the nuts are installed and tightened.

In the disclosed embodiment, the structure of the individual wheel fasteners which is engaged by the retention tabs 52 comprises a circular flange 64 which extends around the outside of the nut 28. The arcuate span of each tab 52 within aperture 36 is somewhat slightly less than 180°.

FIG. 5 shows that the preferred retention tab structure 52 comprises two individual tab sections 68 which are separated by a central gap 70. This particular construction may be desirable from a standpoint of fabrication; however, it will be appreciated that the particular shape of the retention tab structure may be other than that shown in accordance with the needs for a particular installation and manufacturing considerations. In all instances the retention tabs must be designed in accordance with the criteria referred to above involving an interference fit with the wheel fasteners 20 and resultant tab flexing.

In the preferred construction the hubcap element is preferably one of the rigid, relatively hard, plastic materials which is typically used for this application while the metal retention element is preferably a resilient material such as steel. While such materials are presently preferred, it will be appreciated that principles of the invention may be applied to constructions involving materials other than those presently contemplated.

From the foregoing description it can be seen that a new and improved hubcap assembly construction has been disclosed which possesses the advantages and benefits referred to earlier. The invention provides a hubcap which can sucessfully meet the specifications imposed by automobile manufacturers for plastic hubcaps for down-sized vehicles. While a preferred embodiment has been disclosed, it will be appreciated that principles of the invention are applicable to embodiments other than the specific preferred embodiment disclosed and described herein.

We claim:

1. In combination with a wheel including a rim and a spider, and a hub on which the wheel is mounted by a plurality of wheel fasteners securing the wheel spider to the hub for rotation as a unit about an axis, a hub cap for the wheel spider comprising, in combination, an outer hub cap element and an inner retention element, said hub cap element having an axially facing wall juxtaposed to the spider and including a plurality of apertures, each respective to one of the wheel fasteners, so as to allow said wheel fasteners to extend axially outwardly through said apertures, said retention element including an axially facing annular body portion seated against said wall of said hub cap element, cooperating means on said wall and said annular body portion securing said retention element to said hub cap element, said annular body portion including a plurality of integral retention tabs, each tab being respective to one of said apertures, each tab extending axially outwardly of said body portion and axially through a respective one of said apertures adjacent an edge portion thereof and facing radially of such aperture, said retention tabs having a radially outward free position interference fit with said fasteners and being deflected radially inwardly by said fasteners to exert a radially outward retaining force on such fasteners for retaining the hub cap on the wheel.

2. A hubcap as recited in claim 1 wherein the cooperating means includes a plurality of axially extending members on the axially facing wall of the hubcap element and lanced fingers on the retention element engaging such members.

3. A hubcap as recited in claim 1 wherein the outer hubcap element is formed of plastic material, the inner retention element is formed of metal, and the cooperating means includes a plurality of axially extending integral pins on the axially facing wall of the hubcap element and a plurality of lanced fingers on the retention element engaging the pins.

4. A hubcap as recited in claim 1 wherein the hubcap element apertures have their axes located on a circle and the cooperating means includes a plurality of axially extending members on the axially facing wall of the hubcap element and lanced fingers on the retention element engaging such members, such members being located on the same circle as the axes of the apertures and being located between the apertures.

5. A hubcap as recited in claim 1 wherein the outer hubcap element includes an axially extending annular wall and the inner retention element includes a radial inner axially extending flange engaging the wall of the hubcap element.

6. In combination with a wheel including a rim and a spider, and a hub on which the wheel is mounted by a plurality of wheel fasteners securing the wheel spider to the hub for rotation as a unit about an axis, a hub cap for the wheel spider comprising, in combination, an outer hub cap element and an inner retention element, said hub cap element having an axially facing wall juxtaposed to the spider and including apertures respective to and arranged in a pattern corresponding to that of the wheel fasteners, said apertures including at least a partial axially arcuate edge portion, said wheel fasteners extending axially outwardly past said edge portions of said apertures, said retention element including an annular body portion generally coterminus with said wall of the hub cap element and seated thereagainst, cooperating integral means on said wall and said body portion securing said retention element to said hub cap element, said portion including a plurality of integral retention tabs extending axially outwardly therefrom across integral beads, each tab facing radially and having an axially arcuate surface generally parallel to said edge portion of the aperture, each tab extending axially outwardly adjacent and past such respective edge portion, said retention tabs being deflected radially inwardly of said body portion and said apertures by said wheel fasteners and exerting a radially outward force on said fasteners for retaining the hub cap on the wheel.

7. In combination with a wheel including a rim and a spider, and a hub on which the wheel is mounted by a plurality of wheel fasteners securing the wheel spider to the hub for rotation as a unit about an axis, a hub cap for the wheel spider comprising, in combination, an outer hub cap element and an inner retention element, said hub cap element having an annular axially facing wall juxtaposed to the spider and including a plurality of edge generally circular apertures, each respective to one of the wheel fasteners, so as to allow said wheel fasteners to extend axially outwardly past said apertures, said retention element including an axially facing annular body portion seated against said wall of said hub cap element, cooperating means on said wall and said annular body portion securing said metal retention element to said hub cap element, said annular body portion including a plurality of radially facing axially extending arcuate retention tabs, each retention tab being respective to one of said apertures and extending axially outwardly through such respective aperture adjacent the edge thereof, each of said retention tabs being subdivided into a plurality of sections engageable with a respective wheel fastener and deflected radially inwardly thereby to exert a radially outward force on such fastener for retaining the hub cap on the wheel.

* * * * *

UNITED STATES PATENT AND TRADEMARK OFFICE
CERTIFICATE OF CORRECTION

PATENT NO. : 4,457,560

DATED : July 3, 1984

INVENTOR(S) : Robert L. Rowe and Kenneth W. Christensen

It is certified that error appears in the above-identified patent and that said Letters Patent is hereby corrected as shown below:

On the title page, /73/ Assignees: should read,

Assignees: General Motors Corporation, Detroit, Michigan and Part Interest Robert L. Rowe Signed and Sealed this Twenty-seventh Day of November 1984

[SEAL]

Attest:

GERALD J. MOSSINGHOFF

Attesting Officer    Commissioner of Patents and Trademarks